(12) United States Patent
Woodford et al.

(10) Patent No.: US 8,182,180 B2
(45) Date of Patent: May 22, 2012

(54) PROPANE TANK TIE-DOWN DEVICE

(76) Inventors: Steve William Woodford, Hurricane, UT (US); Maria Magdalena Wijnker, Hurricane, UT (US)

( * ) Notice: Subject to any disclaimer, the term of this patent is extended or adjusted under 35 U.S.C. 154(b) by 151 days.

(21) Appl. No.: 12/658,283

(22) Filed: Feb. 10, 2010

(65) Prior Publication Data
US 2010/0209208 A1    Aug. 19, 2010

Related U.S. Application Data

(60) Provisional application No. 61/207,414, filed on Feb. 13, 2009.

(51) Int. Cl.
*B60P 7/12* (2006.01)
(52) U.S. Cl. ............... 410/47; 410/19; 410/20
(58) Field of Classification Search .............. 410/47, 410/2–3, 10–11, 97, 23, 96, 102, 107, 106, 410/110, 116, 19, 20; *B60P 7/12*
See application file for complete search history.

(56) References Cited

U.S. PATENT DOCUMENTS

| | | | | |
|---|---|---|---|---|
| 2,055,829 A * | 9/1936 | Tobin | ............................... | 410/20 |
| 2,756,693 A * | 7/1956 | Frost | ............................... | 410/116 |
| 4,611,961 A * | 9/1986 | Van Iperen et al. | ............. | 410/20 |
| 5,165,584 A * | 11/1992 | Meagher et al. | ............... | 224/258 |
| 6,386,559 B1 * | 5/2002 | Souza | ........................ | 280/47.26 |
| 6,390,744 B1 | 5/2002 | Parkins | | |
| 6,394,720 B1 * | 5/2002 | McCay | ........................ | 410/100 |
| 6,863,198 B1 | 3/2005 | Darby | | |
| 7,025,545 B1 * | 4/2006 | Robison | ......................... | 410/20 |
| 7,131,618 B2 | 11/2006 | Berry | | |
| 7,270,507 B1 * | 9/2007 | Jernigan | ......................... | 410/50 |
| 7,438,510 B1 * | 10/2008 | Ledford | ........................... | 410/3 |
| 7,644,819 B2 * | 1/2010 | Gill et al. | ...................... | 206/446 |

\* cited by examiner

*Primary Examiner* — Glenn Dayoan
*Assistant Examiner* — Sunsurraye Westbrook

(57) ABSTRACT

The removable tie-down device is comprised of a plurality of straps that are attached to each other in such a way as to form a tie-down device for the safe transportation of a cylindrical object, for example a propane tank, in the bed of a pickup truck by securing the propane tank to the inside of the trucks tailgate. When in use, two main straps pass from a readily available conventional tightening device down the vertical side and under the bottom rounded shoulders and to both sides of the base ring of the propane tank positioned vertically against the inside of the tailgate and standing on the truck bed. These two main straps then pass under the bottom edge, up the vertical outside surface and over the top surface of the tailgate, and then pass over the tank to connect to the tightening device.

1 Claim, 6 Drawing Sheets

PROPANE TANK TIE-DOWN DEVICE

CROSS-REFERENCE TO RELATED APPLICATIONS

This application claims the benefit of provisional patent application Ser. No. 61/207,414, filed 2009 Feb. 13 by the present inventor.

FEDERALLY SPONSORED RESEARCH

Not Applicable

SEQUENCE LISTING OR PROGRAM

Not Applicable

BACKGROUND

1. Field of Invention

The present embodiment relates to a tie-down device that secures a portable propane tank to the inside surface of a tailgate of a pickup truck for safe transportation.

2. Prior Art

Propane tanks come in a variety of sizes, depending on the purpose involved. There are, on the one hand, small disposable propane tanks that are used for outdoor activities like camping, where they are utilized for cooking when attached to a stove, or lighting when attached to a lamp. These small tanks are disposed of when empty.

There are also large propane tanks that are used for industrial or residential purposes. These large tanks are placed in position at a location and remain in a static position. When they require filling, a propane truck delivers the liquid propane and fills the tank by means of a hose.

Now there are a variety of sizes of propane tanks used in the recreational vehicle field, and also for BBQ cookers, used by millions of homeowners in their backyards. Many businesses also utilize these portable propane tanks for powering forklifts. These propane tanks are most commonly of the 20 lb, or 5 gallon, and the 30 lb, or 7 gallon sizes. These propane tanks have the same diameter, but vary in height, according to the capacity.

When these portable propane tanks are empty, they have to be transported from a BBQ or recreational trailer to a refilling depot or station for filling. They are heavy and difficult to carry and most people transport them in the bed of a pickup truck. Many people use a bungee, rope or string to tie the tank down for transportation, or somehow wedge the tank behind some object in the bed of the truck.

However, when accelerating, braking or making sharp turns, these tanks can easily be dislodged or slide, becoming dangerous missiles which can pose a significant risk to others. In the past, these propane tanks have been known to explode, causing serious consequences. Many people transporting these propane tanks do not realize exactly how dangerous they can be.

No device exists on the market today that can be used to safely and securely transport these propane tanks in the bed of a pickup truck. A possible reason is because the device must be strong enough to retain the tank in the event of sudden hard stops or turns. Also it should not be permanently mounted in the pickup truck bed thereby taking up too much space when not in use.

Also, such a device would require drilling into the truck frame to secure the device, or clamp to the side-rail of the pickup bed. Most people do not want to cause possible damage or scratches to their trucks. Furthermore, the device should be simple to use, and fold up for easy storage when not in use.

Devices that hold propane tanks in the bed of a pickup truck are, in general, known. These devices differ substantially in design, material respects and use thereof. These differences, which will be described in more detail hereinafter, are essential for understanding the disadvantages and problems inherent in these devices.

For example U.S. Pat. No. 7,131,618 to Berry (2006) is only a base stand for keeping the tank upright in the bed of a pick-up truck, but does not address the problem of keeping the propane tank secure to the truck at all. Any sudden and hard braking would still result in the propane tank becoming a dangerous missile, with serious consequences.

U.S. Pat. No. 6,863,198 to Darby (2005) discloses a complicated device that clamps to one of the sidewalls of the bed of a pickup truck. This device is only attached to the truck at one point, the top rim of the sidewall. So in the event of sudden hard stops, the device and tank could pivot on this one point, leading to possible serious torque and damage to the device, tank and truck. It is also of a complicated design which does not lend itself to easy manufacturing. This device also needs tools to install and remove, thereby making it complicated to use.

The only device that utilizes the concept of attaching to the tailgate of a pickup truck is the "Tie Down Anchor", U.S. Pat. No. 6,390,744 to Parkins (2002). This device utilizes a single strap attached to the tailgate of a pickup truck, and is a general use anchor to which another tie-down must be attached to be effective. If strap 38 of the "Tie Down Anchor" were to encompass a cargo in the bed of the pickup truck as well as the tailgate, then the parts shown in FIGS. 1, 2, and 3 of U.S. Pat. No. 6,390,744 would not be necessary. This device is also of a complicated design that would not effectively keep an object secure as it has only one attachment point to the pickup truck, thus allowing for lateral and longitudinal movement, pivoting at this one point.

Accordingly, there exists a need in the art for a propane tank tie-down device that is safe, secure, simple to use and inexpensive to manufacture. The device should also adapt to fit the most common sizes of portable propane tanks for transport in the bed of a pickup truck, and attached to the tailgate of the truck. The tie-down device must have near universal usage ability so that the device can be used on a wide variety of pickup truck tailgates.

SUMMARY

In accordance with one embodiment the tie-down device comprises a plurality of straps which can be secured to the top, one vertical length and bottom sides of a cylinder, such as a portable propane tank, and to the bottom, outside vertical surface and top surface of a tailgate of a pickup truck, to secure the propane tank in the truck bed and to the inside of the tailgate for transportation.

REFERENCE NUMBERS AND LETTERS

FIG. 1

Figure 1:
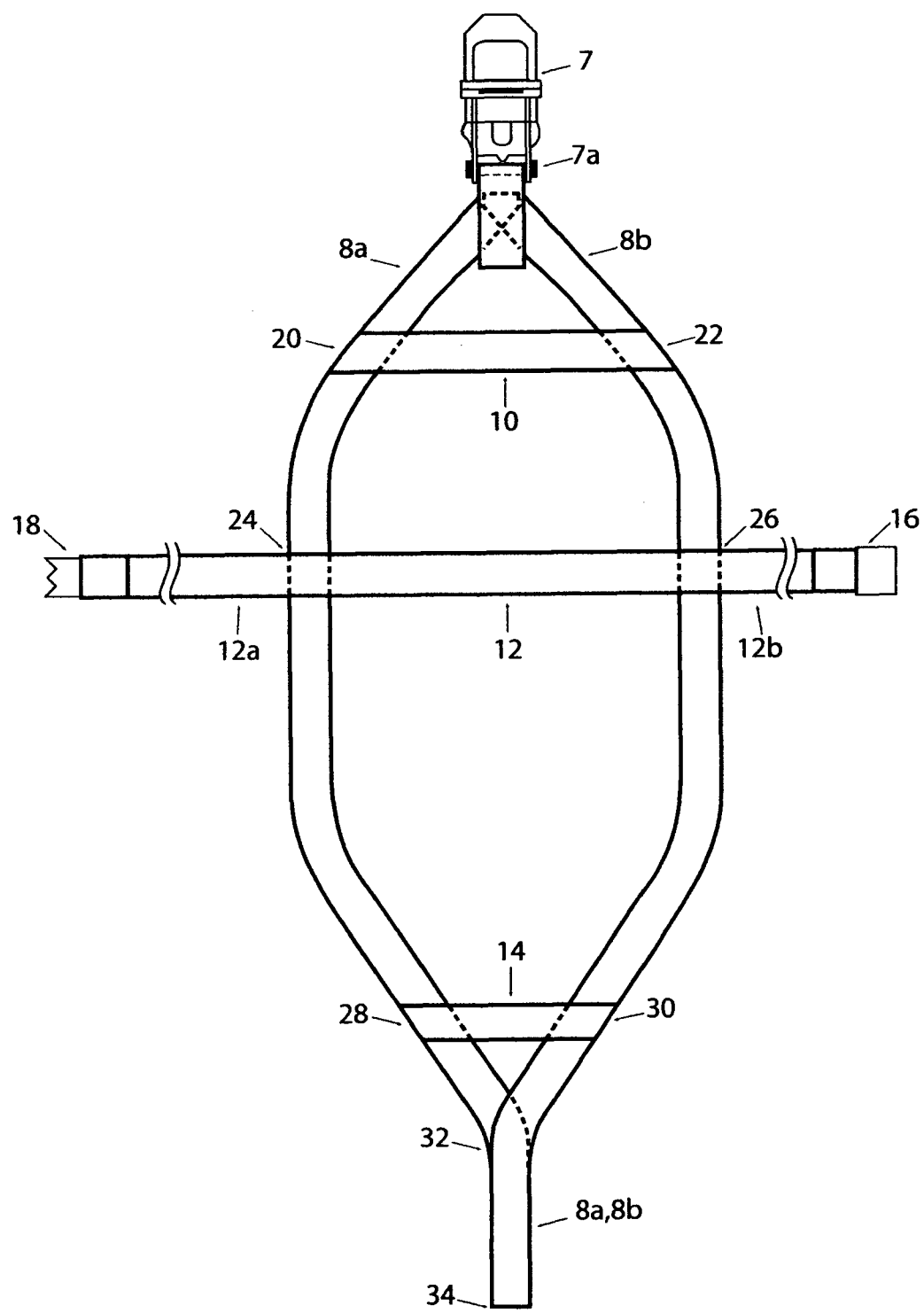
FIG. 1 is a plan view of the tie-down device.
Figure 2:
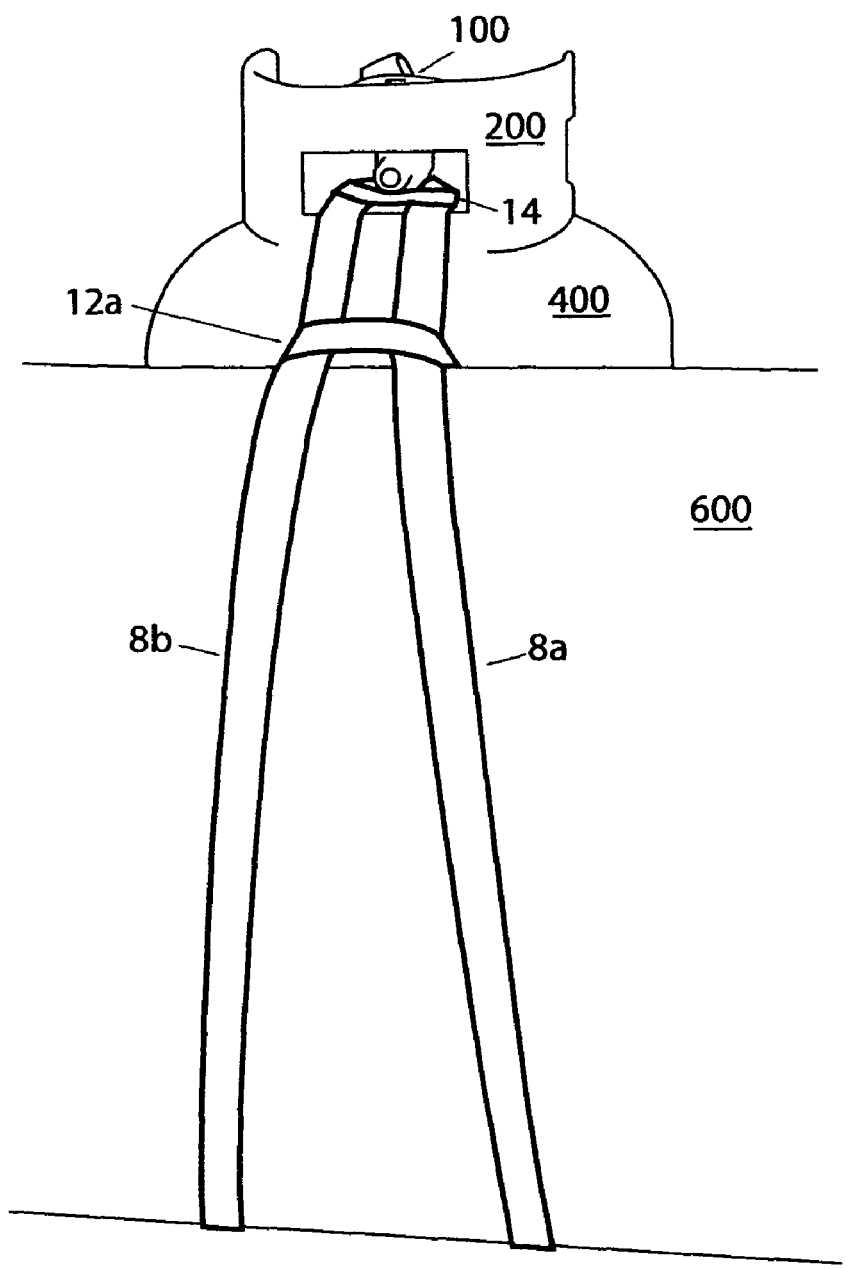
FIG. 2 is an elevational view of the tie-down device in use.

Number 7 refers to any readily available conventional tightening device.
Number 7a refers to the attachment point of this embodiment to Number 7.
Number 8a refers to one of the two main straps of the first embodiment.
Number 8b refers to the other of the two main straps of the first embodiment.
Number 10 refers to a cross-strap attached to strap 8a at attachment 20 and also attached to strap 8b at attachment 22.
Number 12 refers to a cross-strap attached to strap 8a at attachment 24 and also attached to strap 8b at attachment 26.
Number 12a refers to an extension of strap 12.
Number 18 refers to a readily available conventional closing device that would connect and close with number 16.
Number 12b refers to an other extension of strap 12.
Number 16 refers to a readily available conventional closing device that would connect and close with number 18.
Number 14 refers to a cross-strap attached to strap 8a at attachment 28 and also attached to strap 8b at attachment 30.
Number 34 refers to the ends of strap 8a and strap 8b which are overlapped and attached from the point of convergence at number 32.

FIG. 2

Number 14 refers to a cross-strap attached to strap 8a at attachment 28 (see FIG. 1) and also attached to strap 8b at attachment 30 (see FIG. 1).
Number 12a refers to an extension of strap 12.
Number 8a refers to one of the two main straps.
Number 8b refers to the other of the two main straps.
Number 100 refers to an open/close handle of a propane tank valve-assembly.
Number 200 refers to a propane tank valve-assembly guard ring.
Number 400 refers to a propane tank.
Number 600 refers to a tailgate of a pickup truck.

FIG. 3

Number 14 refers to a cross-strap attached to strap 8a at attachment 28 (see FIG. 1) and also attached to strap 8b at attachment 30 (see FIG. 1).
Number 8a refers to one of the two main straps.
Number 8b refers to the other of the two main straps.
Number 12a refers to an extension of strap 12.
Number 100 refers to an open/close handle of the propane tank valve-assembly.
Number 200 refers to a propane tank valve-assembly guard ring.
Number 300 refers to a propane tank valve-assembly.
Number 400 refers to a propane tank.
Number 600 refers to a tailgate of a pickup truck.
Number 700 refers to a bed of a pickup truck.

FIG. 4

Number 14 refers to a cross-strap attached to strap 8a at attachment 28 (see FIG. 1) and also attached to strap 8b at attachment 30 (see FIG. 1).
Numbers 8a,8b refer to the section from attachment 32 (see FIG. 1) to 34 (see FIG. 1).
Number 7 refers to any readily available conventional tightening device.
Number 8a refers to one of the two main straps.
Number 8b refers to the other of the two main straps.
Number 10 refers to a cross-strap attached to strap 8a at attachment 20 (see FIG. 1) and also attached to strap 8b at attachment 22 (see FIG. 1).
Number 100 refers to an open/close handle of a propane tank valve-assembly.
Number 200 refers to a propane tank valve-assembly guard ring.
Number 300 refers to a propane tank valve-assembly.
Number 400 refers to a propane tank.
Number 500 refers to a propane tank base ring.
Number 600 refers to a tailgate of a pickup truck.
Number 700 refers to a bed of a pickup truck.

FIG. 5

Number 12a refers to an extension of strap 12.
Number 8a refers to one of the two main straps.
Number 8b refers to the other of the two main straps.
Number 18 refers to a readily available conventional closing device that would connect and close with number 16 (shown here connected to number 16).
Number 16 refers to a readily available conventional closing device that would connect and close with number 18 (shown here connected to number 18).
Number 12b refers to an other extension of strap 12.
Number 7 refers to any readily available conventional tightening device.
Number 100 refers to an open/close handle of a propane tank valve-assembly.
Number 200 refers to a propane tank valve-assembly guard ring.
Number 300 refers to a propane tank valve-assembly.
Number 400 refers to a propane tank.
Number 500 refers to a propane tank base ring.
Number 600 refers to a tailgate of a pickup truck.
Number 700 refers to a bed of a pickup truck.

FIG. 6

Number 7 refers to a readily available conventional tightening device.
Number 7a refers to the attachment point of strap 8a and 8b to Number 7.
Number 8a refers to one of the two main straps.
Number 8b refers to the other of the two main straps.
Number 10 refers to a cross-strap attached to strap 8a at attachment 20 and also attached to strap 8b at attachment 22.
Number 12 refers to a cross-strap attached to strap 8a at attachment 24 and also attached to strap 8b at attachment 26.
Number 12a refers to an extension of strap 12.
Number 18 refers to a readily available conventional closing device that would connect and close with number 16.
Number 12b refers to an other extension of strap 12.
Number 16 refers to a readily available conventional closing device that would connect and close with number 18.
Number 600 refers to a tailgate of a pickup truck.
Number 700 refers to a bed of a pickup truck.

DETAILED DESCRIPTION OF THE PREFERRED EMBODIMENT

FIG. 1 shows the first embodiment, comprising a tie-down device which can be secured to the top, one vertical length and bottom sides of a cylinder, such as a portable propane tank, and to the bottom, outside vertical surface and top surface of a tailgate of a pickup truck, to secure the propane tank to the inside surface of the tailgate for transportation.

Figure 4:
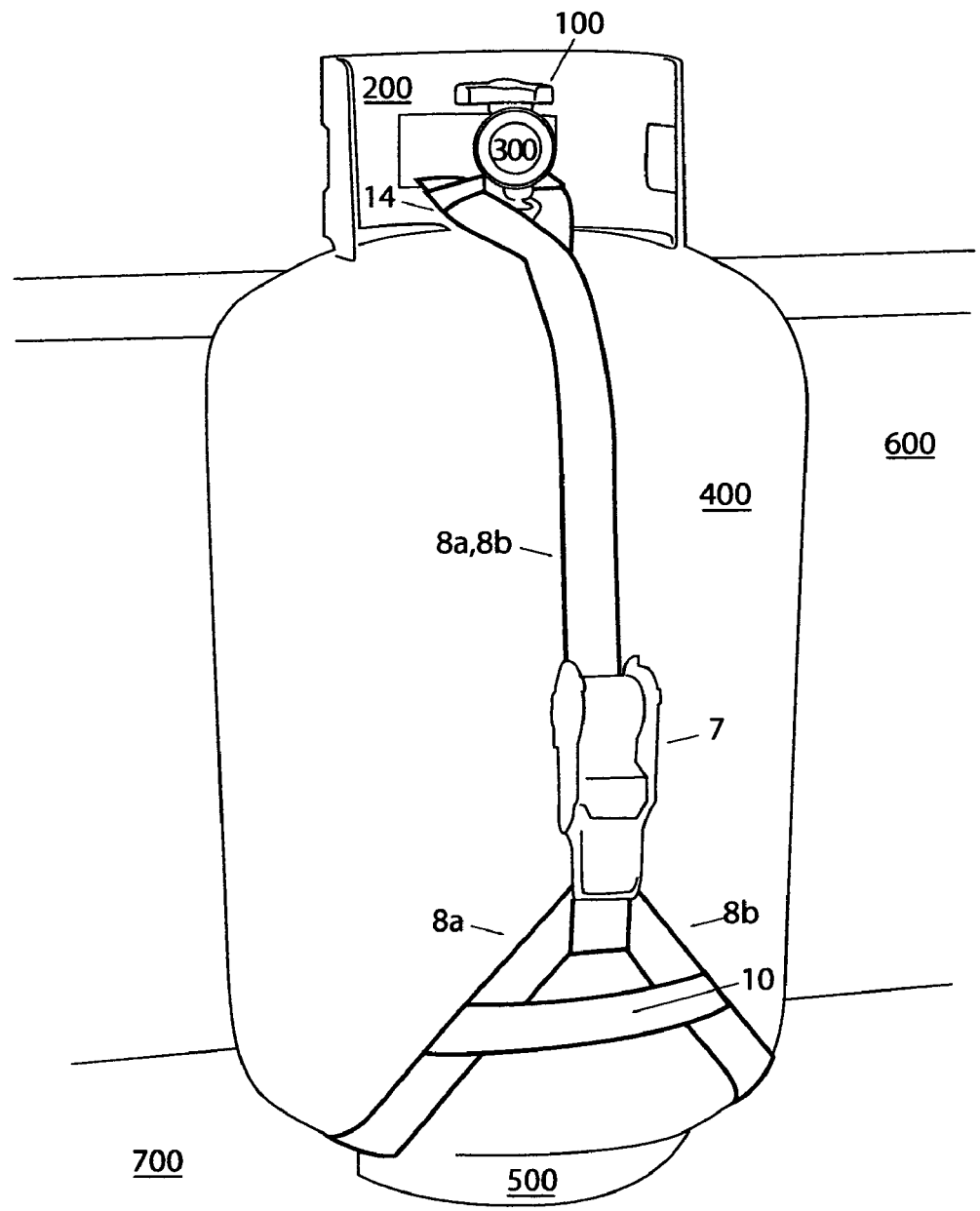
FIG. 4 is a front view of the tie-down device in use.

As best shown in FIG. 4, a portable propane tank 400 typically comprises a vertical cylindrical body, supported on a circular base ring 500. The base ring 500 is a generally ring-like annular structure formed of a thin strip of metal, such as steel, and fixedly attached to the bottom of the propane tank 400, such as by welding. The lower portion of the propane tank 400 is typically formed into a rounded shoulder where the vertical side of the propane tank 400 transitions into the bottom of the propane tank 400.

The upper portion of the propane tank 400 is typically formed into a rounded shoulder where the vertical side of the propane tank 400 transitions into the top of the propane tank 400. In the top center of the propane tank 400 is located a threaded hole into which is screwed a valve assembly 300 which has an open/close handle 100 as shown in FIGS. 2, 3, 4 and 5.

Fixedly attached, by means of welding, in a semi-circular position around the valve assembly 300 is a raised thin strip of metal, typically steel, that serves as protection for the valve assembly 300. This is referred to as the valve guard ring 200, as shown best in FIG. 3. This valve guard ring 200 usually has two or three apertures in the sides, also shown best in FIG. 3, which can serve as hand-holds for lifting and handling.

First Embodiment—FIG. 1

In the first embodiment, two main straps 8a and 8b, fabricated of a non-stretchable and readily available material such as nylon, polyester or cotton strapping or webbing and having a minimum breaking strain of 100 pounds, are attached at one end, for example by sewing but any other means such as riveting could be utilized, to 7a which could be a cross-pin, ring or shackle of a readily available conventional tightening device 7, for example of a known ratchet design.

At present I contemplate the use of one inch wide polyester webbing of 1200 pound breaking strain. I also contemplate the method of attachment of one strap to another in all embodiments to be by sewing.

From 7a, the two aforementioned straps 8a and 8b diverge from each other, forming an angle of about 90 degrees. The other ends of strap 8a and strap 8b converge and are overlapped and joined from location 32 to location 34 in such a manner as to form a single strap.

The length of strap 8a and strap 8b of the first embodiment should be of a predetermined length to include the distance from the top edge of tailgate 600, over the top of propane tank 400, down a vertical side of tank 400, passing round the bottom rounded shoulders of tank 400, thence under the tailgate 600 of the pickup truck, and thence up the vertical outside surface and over the top surface of tailgate 600, with sufficient extra strap to enable joining to tightening device 7.

In the first embodiment I envisage the length of the aforementioned straps 8a and 8b, from attachment point 7a to location 34, to be about seventy four inches.

Second Embodiment—FIG. 1

In the second embodiment, the aforementioned main straps 8a and 8b are connected by cross-strap 10 at location 20 on strap 8a and at location 22 on strap 8b, and forming a rhombus, and also fabricated of the aforementioned non-stretchable material and of similar strength to the first embodiment straps 8a and 8b.

I also envisage the length of cross-strap 10 to be about five inches, including the overlapped and attached sections on straps 8a and 8b, and being attached four inches from point 7a at location 20 on strap 8a and at location 22 on strap 8b.

Third Embodiment—FIG. 1

In the third embodiment, cross-strap 12, also fabricated of the aforementioned non-stretchable material and of similar strength to the first embodiment, is attached at one end at location 24 on strap 8a, and the other end of cross-strap 12 is attached to strap 8b at location 26.

I envisage cross-strap 12 to be about eleven inches in length, including the overlapped and attached sections on straps 8a and 8b.

I also envisage one end of cross-strap 12 being attached about sixteen inches from point 7a, at location 24 on strap 8a and the other end of cross-strap 12 being attached about sixteen inches from point 7a, at location 26 on strap 8b.

Fourth Embodiment—FIG. 1

In the fourth embodiment, strap 12a is extended outward from attachment location 24 on strap 8a, and strap 12b is extended outward from attachment location 26 on strap 8b.

Figure 5:
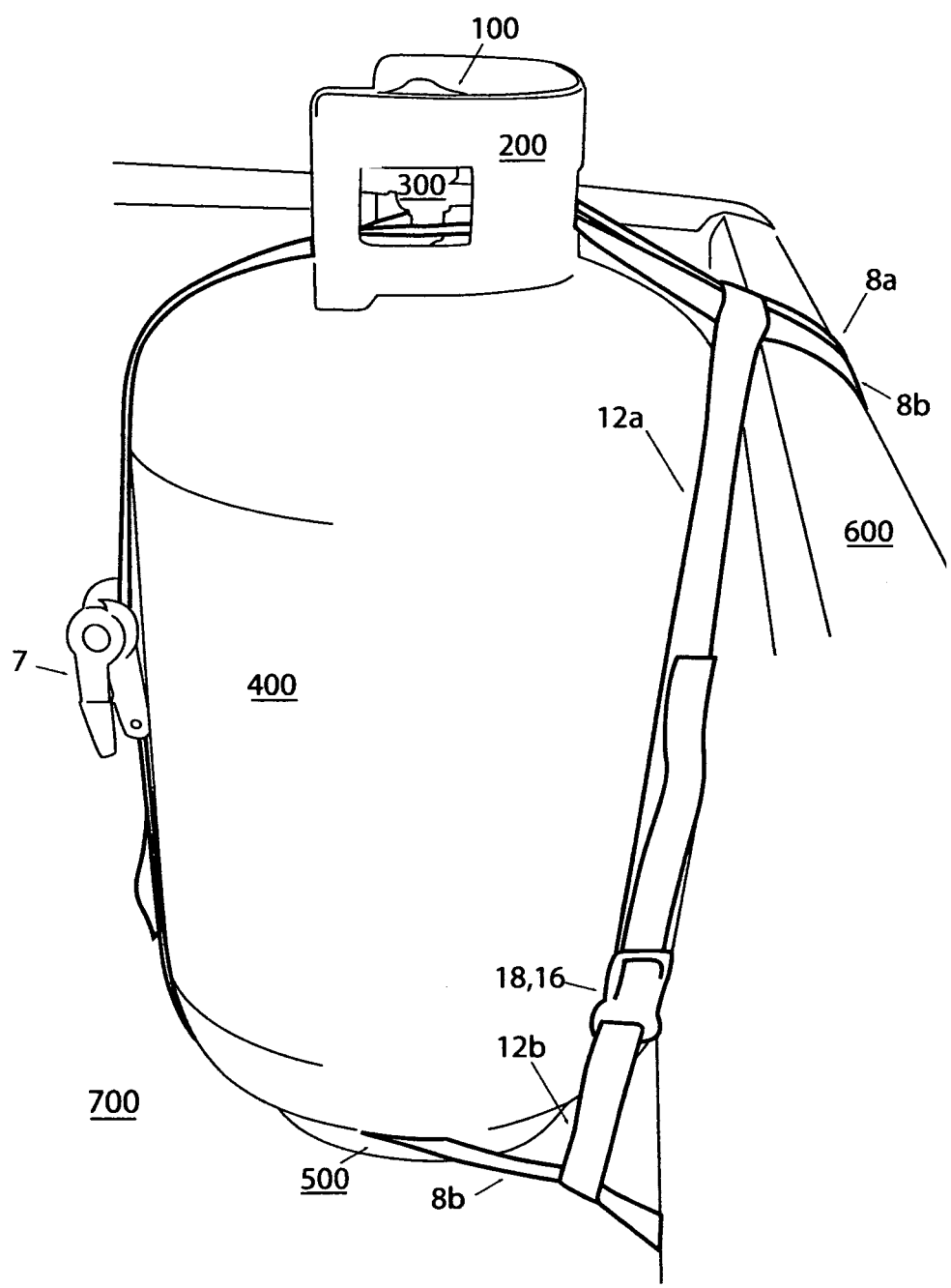
FIG. 5 is a side view of the tie-down device in use.

These extensions, 12a and 12b, of strap 12 are of sufficient lengths to enable them to be joined when in use by means of any readily available closing device 16 and 18, for example a plastic, nylon or metal buckle comprising two interlocking rigid parts where one rigid part could be attached, for example by sewing, to one end of strap 12a, and the other rigid part being adjustably attached to the end of strap 12b, thereby enabling cross-strap 12 to be tightened, as shown best in FIG. 5.

I envisage the overall length of strap 12, including the aforementioned extensions 12a and 12b, to be about sixty inches and fabricated of similar material and strength to the straps of the aforementioned embodiments.

Fifth Embodiment—FIG. 1

In the fifth embodiment, cross-strap 14, also fabricated of the aforementioned suitable non-stretchable material, is attached at one end to strap 8a at location 28, and the other end of cross-strap 14 is attached to strap 8b at location 30, and forming a rhombus.

I envisage the length of cross-strap 14 to be about three inches including the overlapped and attached parts on strap 8a and strap 8b and manufactured of the aforementioned material.

I also envisage cross-strap 14 to be attached about fifty four inches from attachment point 7a, at location 28 on strap 8a, and at location 30 on strap 8b.

It will be apparent to a person of ordinary skill in the relevant art that the placement and attachment locations of each of the aforementioned cross-straps 10, 12 and 14 to straps 8a and 8b of the first embodiment, are such that they are parallel each to the other. These cross-straps facilitate the correct placement of a propane tank when said embodiment is placed in the bed of a pickup truck, and also contribute to the security of the tank when the device is in use.

Also, referring to FIG. 1, the combined distance, measured from attachment locations 20 to 22 to 26 to 24 and back to 20, is such that it is less than the circumference of a standard 20 lb or 30 lb propane tank, which is 39 inches.

It will also be apparent to a person of ordinary skill in the relevant art that the material used to fabricate all the aforementioned straps shown in FIG. 1, either nylon, polyester or cotton webbing or strapping, could be of any suitable width, thickness and strength, and that any suitable colors could be utilized.

The aforementioned readily available tightening device 7 could be of a known ratchet design, thus providing a simple means of joining and tightening the embodiment when in use.

Figure 6:
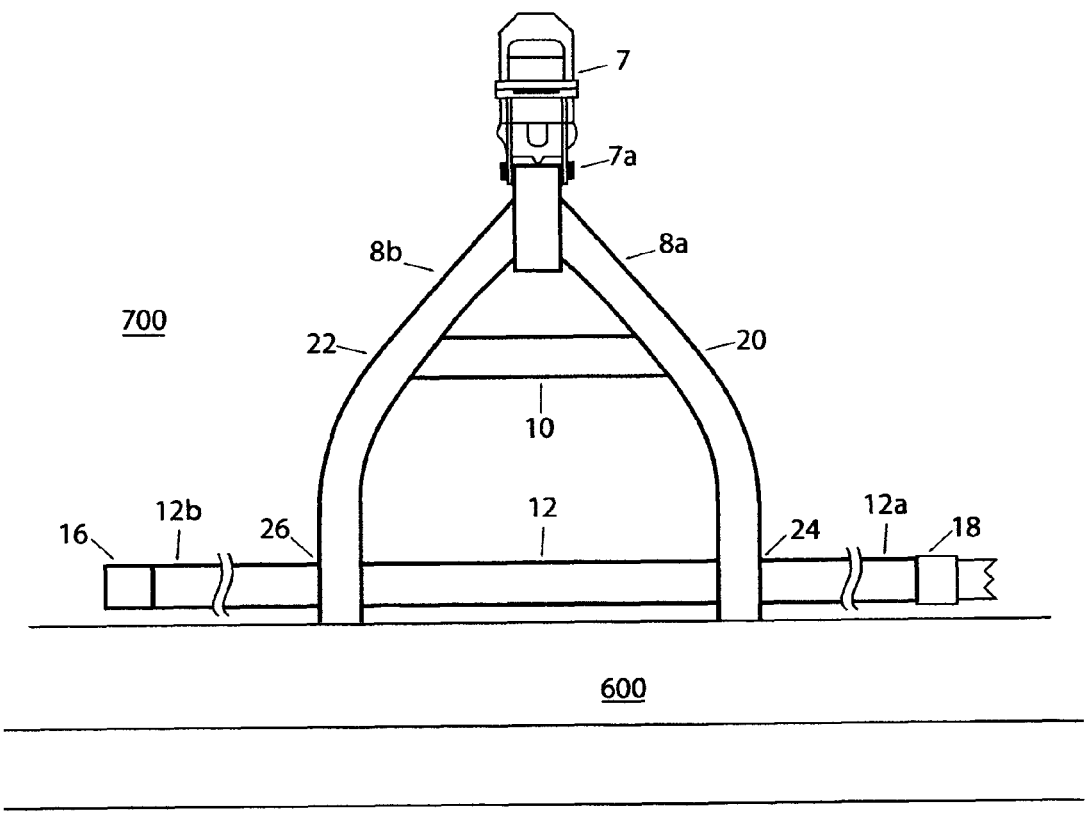
FIG. 6 is an elevational view of a part of the tie-down device ready for use, laying in the bed of a pickup truck.

Also, as shown in FIG. 6, the aforementioned cross-strap 12 is attached, as previously described, to the aforementioned strap 8a and strap 8b to facilitate the correct placement of a propane tank in the space between cross-strap 12 and the aforementioned cross-strap 10, when the embodiment is placed in the bed of a pickup truck prior to use.

Operation of the Preferred Embodiment

To secure a propane tank 400 in bed 700 of a pickup truck for transport, the embodiment is placed in bed 700 of the pickup truck, as shown in FIG. 6. The overlapped and sewn "tail" end 34 of the embodiment, is then passed from the direction of truck bed 700, through the gap between the bottom of closed tailgate 600 and the back edge of bed 700 of the pickup truck, and pulled through until cross-strap 12 is about 2 inches from the inside of tailgate 600. Cross-strap 12 and cross-strap 10 should be placed so that they, and also strap 8a and strap 8b, are at their maximum distance apart.

Propane tank 400 is then placed in an upright position in the space between strap 10 and strap 12, with valve assembly 300 facing towards the cab of the pickup truck. The "tail" end 34 of joined strap 8a and strap 8b is brought over the top of tailgate 600, and passed through the center aperture of valve guard ring 200. The triangle, formed by strap 8a and 8b and cross-strap 14, is placed over handle 100 and valve assembly 300, so that strap 14 is against valve assembly 300. This placement of strap 14 ensures the correct positioning of the tie-down device on propane tank 400.

Now, tightening device 7 is placed against the vertical side of propane tank 400, and "tail" end 34 is connected to device 7, which is tightened to firmly attach tank 400 to tailgate 600, as shown in FIGS. 4 and 5.

Figure 3:
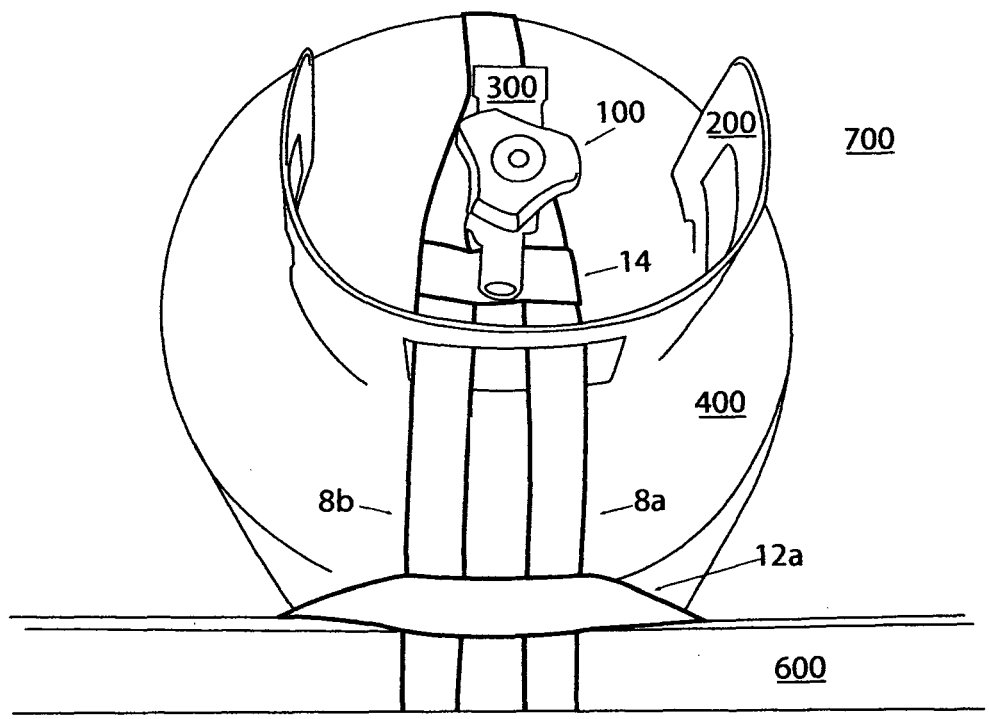
FIG. 3 is an elevational view of the tie-down device.

As shown in FIGS. 3 and 5, strap 12a and strap 12b are joined by utilizing the aforementioned buckles 16 and 18, by firstly passing the longer of the two straps over strap 8a and strap 8b between tailgate 600 and propane tank 400, and tightened. Propane tank 400 is now secure for transport.

The tie-down device of the embodiment is simple and cheap to manufacture, easy to use, holds a cylindrical propane tank safe and secure for transportation in the bed of a pickup truck, even in the event of sudden, hard braking or cornering. The tie-down device of the embodiment is easily installed and removed, does not require drilling or permanent attachment to a pickup truck, and can be folded up and stored in a small space, for example, under the seat in the front cab of a pickup truck.

CONCLUSION, RAMIFICATION AND SCOPE

While the above description contains many specificities, these should not be construed as limitations on the scope of any embodiment, but as exemplifications of the presently preferred embodiments thereof. Many other ramifications and variations are possible within the teachings of the various embodiments.

For example, referring to FIG. 1, strap extensions 12a and 12b including buckles 16 and 18, could instead of being extensions of strap 12, be made extensions of cross-strap 10, thus encompassing the circumference of propane tank 400. Either one of these configurations would ensure that the propane tank 400 will not detach from the tie-down device in the event of tailgate 600 opening during transport.

Now, the embodiment, excluding the fourth embodiment, could be sufficient to secure propane tank 400 to tailgate 600 and in bed 700 of the pickup truck. However, as an extra precaution, cross-strap 12 has been extended to each side as previously described, and shown in FIGS. 1, 2, 3, and 5, to serve as a safety strap in the unlikely, but possible, event of tailgate 600 opening during transportation.

Also, cross-strap 14, which serves as a guide for the correct placement of the tie-down device on propane tank 400, could be eliminated without compromising the operation of the embodiment under normal operating conditions.

Also, the aforementioned strap 8a and strap 8b, could be of a single length, from location 34, up through attachment point 7a where it could be folded over and attached by any suitable means, for example sewing, and thence back to location 34.

As mentioned before, the material used to fabricate all the aforementioned straps shown in FIG. 1, either nylon, polyester or cotton webbing or strapping, could be of any suitable width, thickness and strength, and that any suitable colors could be utilized. Also, the methods of attachment of the aforementioned straps could be either by riveting or sewing or any means that would ensure a secure attachment.

Also, the readily available conventional tightening device could be of any design which would ensure the secure attachment of propane tank 400 to tailgate 600 of the pickup truck. However I envisage a readily available ratchet device would be used.

While the embodiment has been specifically described in connection with certain specific embodiments thereof, it is to be understood that this is by way of illustration and not of limitation. Reasonable variation and modification are possible within the scope of the foregoing description and drawings without departing from the spirit of the invention.

I envisage this embodiment may also be utilized for securing other objects, such as water or fuel containers for example, to the inside of the tailgate of a pickup truck.

We claim:

1. A propane tank tie-down device comprising:
   (a) a tightening device providing a securing means said tie-down device;
   (b) two main straps 8a and 8b having opposite ends, one end of each of said main straps having means to be permanently attached to said tightening device in such a fashion as to form a predetermined acute angle between said straps;
   (c) a connecting means to predetermined locations of said main straps so that they extend in a spaced relation each to the other but so that said main straps cannot be separated more than a predetermined distance;
   (d) said main straps being of a predetermined length such that said main straps will vertically encompass a tailgate of a pickup truck and said propane tank placed vertically in a truck bed and against said tailgate of said pickup truck;
   (e) said main straps extending to a predetermined point 32 wherein said straps now converge and overlap to form a single strap;
   (f) said single strap so formed being of a predetermined length so that the end thereof is removably disposed within said tightening device;
   (g) a plurality of cross-straps of different lengths;
   (h) a joining means to said cross-straps to said main straps at predetermined spaced locations such that said cross-straps are positioned parallel to each other;
   (i) said straps of said tie-down device being manufactured of webbing of a predetermined size and breaking strain;
   whereby said tie-down device can be easily secured to said propane tank and said tailgate of said pickup truck thereby providing for safe transportation thereof and allowing for quick removal of said propane tank and said tie-down device after use without requiring the use of tools.

* * * * *